(12) United States Patent
Master et al.

(10) Patent No.: US 7,937,591 B1
(45) Date of Patent: May 3, 2011

(54) METHOD AND SYSTEM FOR PROVIDING A DEVICE WHICH CAN BE ADAPTED ON AN ONGOING BASIS

(75) Inventors: Paul L. Master, Sunnyvale, CA (US); John Watson, Edgewood, WA (US)

(73) Assignee: QST Holdings, LLC, Palo Alto, CA (US)

( * ) Notice: Subject to any disclaimer, the term of this patent is extended or adjusted under 35 U.S.C. 154(b) by 903 days.

(21) Appl. No.: 10/280,496

(22) Filed: Oct. 25, 2002

(51) Int. Cl.
*G06F 11/30* (2006.01)
*G06F 12/14* (2006.01)

(52) U.S. Cl. .................. 713/189; 713/1; 713/2; 726/24

(58) Field of Classification Search ................. 713/189
See application file for complete search history.

(56) References Cited

U.S. PATENT DOCUMENTS

| | | |
|---|---|---|
| 3,409,175 A | 11/1968 | Byrne |
| 3,666,143 A | 5/1972 | Weston |
| 3,938,639 A | 2/1976 | Birrell |
| 3,949,903 A | 4/1976 | Benasutti et al. |
| 3,960,298 A | 6/1976 | Birrell |
| 3,967,062 A | 6/1976 | Dobias |
| 3,991,911 A | 11/1976 | Shannon et al. |
| 3,995,441 A | 12/1976 | McMillin |
| 4,076,145 A | 2/1978 | Zygiel |
| 4,143,793 A | 3/1979 | McMillin et al. |
| 4,172,669 A | 10/1979 | Edelbach |
| 4,174,872 A | 11/1979 | Fessler |
| 4,181,242 A | 1/1980 | Zygiel et al. |
| RE30,301 E | 6/1980 | Zygiel |
| 4,218,014 A | 8/1980 | Tracy |
| 4,222,972 A | 9/1980 | Caldwell |
| 4,237,536 A | 12/1980 | Enelow et al. |
| 4,252,253 A | 2/1981 | Shannon |
| 4,302,775 A | 11/1981 | Widergren et al. |

(Continued)

FOREIGN PATENT DOCUMENTS

DE 100 18 374 A1 10/2001

(Continued)

OTHER PUBLICATIONS

Abnous et al., "Ultra-Low-Power Domain-Specific Multimedia Processors," VLSI Signal Processing, IX, 1998, IEEE Workshop in San Francisco, CA, USA, Oct. 30-Nov. 1, 1998, pp. 461-470.

(Continued)

*Primary Examiner* — Emmanuel L Moise
*Assistant Examiner* — Shewaye Gelegay
(74) *Attorney, Agent, or Firm* — Nixon Peabody, LLP

(57) ABSTRACT

A method and system for adapting a device is disclosed. The method and system comprises providing a data stream to the device to be changed based upon a parameter. In a second aspect an adaptable device is disclosed. The adaptable device comprises an adaptable computerized environment (ACE) for receiving a data stream that allows the device to be changed based upon a parameter. The adaptable device includes a mechanism within the ACE for authorizing the data stream. A system and method in accordance with the present invention provides a hardware device that can be changed based upon a particular parameter such as time and location. In so doing, a provider of the hardware device can provide a more adaptable component which provides more value to the provider. Indeed, it is possible to give away the hardware upfront or even give an incentive to a receiver of the hardware and thereby use the device in a variety of ways.

16 Claims, 6 Drawing Sheets

U.S. PATENT DOCUMENTS

| | | |
|---|---|---|
| 4,333,587 A | 6/1982 | Fessler et al. |
| 4,354,613 A | 10/1982 | Desai et al. |
| 4,377,246 A | 3/1983 | McMillin et al. |
| 4,380,046 A | 4/1983 | Fung |
| 4,393,468 A | 7/1983 | New |
| 4,413,752 A | 11/1983 | McMillin et al. |
| 4,458,584 A | 7/1984 | Annese et al. |
| 4,466,342 A | 8/1984 | Basile et al. |
| 4,475,448 A | 10/1984 | Shoaf et al. |
| 4,509,690 A | 4/1985 | Austin et al. |
| 4,520,950 A | 6/1985 | Jeans |
| 4,549,675 A | 10/1985 | Austin |
| 4,553,573 A | 11/1985 | McGarrah |
| 4,560,089 A | 12/1985 | McMillin et al. |
| 4,577,782 A | 3/1986 | Fessler |
| 4,578,799 A | 3/1986 | Scholl et al. |
| RE32,179 E | 6/1986 | Sedam et al. |
| 4,633,386 A | 12/1986 | Terepin |
| 4,658,988 A | 4/1987 | Hassell |
| 4,694,416 A | 9/1987 | Wheeler et al. |
| 4,711,374 A | 12/1987 | Gaunt et al. |
| 4,713,755 A | 12/1987 | Worley, Jr. et al. |
| 4,719,056 A | 1/1988 | Scott |
| 4,726,494 A | 2/1988 | Scott |
| 4,747,516 A | 5/1988 | Baker |
| 4,748,585 A | 5/1988 | Chiarulli et al. |
| 4,758,985 A | 7/1988 | Carter |
| 4,760,525 A | 7/1988 | Webb |
| 4,760,544 A | 7/1988 | Lamb |
| 4,765,513 A | 8/1988 | McMillin et al. |
| 4,766,548 A | 8/1988 | Cedrone et al. |
| 4,781,309 A | 11/1988 | Vogel |
| 4,800,492 A | 1/1989 | Johnson et al. |
| 4,811,214 A | 3/1989 | Nosenchuck et al. |
| 4,824,075 A | 4/1989 | Holzboog |
| 4,827,426 A | 5/1989 | Patton et al. |
| 4,850,269 A | 7/1989 | Hancock et al. |
| 4,856,684 A | 8/1989 | Gerstung |
| 4,870,302 A | 9/1989 | Freeman |
| 4,901,887 A | 2/1990 | Burton |
| 4,905,231 A | 2/1990 | Leung et al. |
| 4,921,315 A | 5/1990 | Metcalfe et al. |
| 4,930,666 A | 6/1990 | Rudick |
| 4,932,564 A | 6/1990 | Austin et al. |
| 4,936,488 A | 6/1990 | Austin |
| 4,937,019 A | 6/1990 | Scott |
| 4,960,261 A | 10/1990 | Scott et al. |
| 4,961,533 A | 10/1990 | Teller et al. |
| 4,967,340 A | 10/1990 | Dawes |
| 4,974,643 A | 12/1990 | Bennett et al. |
| 4,982,876 A | 1/1991 | Scott |
| 4,993,604 A | 2/1991 | Gaunt et al. |
| 5,007,560 A | 4/1991 | Sassak |
| 5,021,947 A | 6/1991 | Campbell et al. |
| 5,040,106 A | 8/1991 | Maag |
| 5,044,171 A | 9/1991 | Farkas |
| 5,090,015 A | 2/1992 | Dabbish et al. |
| 5,099,418 A | 3/1992 | Pian et al. |
| 5,129,549 A | 7/1992 | Austin |
| 5,139,708 A | 8/1992 | Scott |
| 5,144,166 A | 9/1992 | Camarota et al. |
| 5,156,301 A | 10/1992 | Hassell et al. |
| 5,156,871 A | 10/1992 | Goulet et al. |
| 5,165,023 A | 11/1992 | Gifford |
| 5,165,575 A | 11/1992 | Scott |
| 5,190,083 A | 3/1993 | Gupta et al. |
| 5,190,189 A | 3/1993 | Zimmer et al. |
| 5,193,151 A | 3/1993 | Jain |
| 5,193,718 A | 3/1993 | Hassell et al. |
| 5,202,993 A | 4/1993 | Tarsy et al. |
| 5,203,474 A | 4/1993 | Haynes |
| 5,218,240 A | 6/1993 | Camarota et al. |
| 5,240,144 A | 8/1993 | Feldman |
| 5,245,227 A | 9/1993 | Furtek et al. |
| 5,261,099 A | 11/1993 | Bigo et al. |
| 5,263,509 A | 11/1993 | Cherry et al. |
| 5,269,442 A | 12/1993 | Vogel |
| 5,280,711 A | 1/1994 | Motta et al. |
| 5,297,400 A | 3/1994 | Benton et al. |
| 5,301,100 A | 4/1994 | Wagner |
| 5,303,846 A | 4/1994 | Shannon |
| 5,325,525 A | 6/1994 | Shan et al. |
| 5,335,276 A * | 8/1994 | Thompson et al. ........... 380/266 |
| 5,336,950 A | 8/1994 | Popli et al. |
| 5,339,428 A | 8/1994 | Burmeister et al. |
| 5,343,716 A | 9/1994 | Swanson et al. |
| 5,361,362 A | 11/1994 | Benkeser et al. |
| 5,367,651 A | 11/1994 | Smith et al. |
| 5,367,687 A | 11/1994 | Tarsy et al. |
| 5,368,198 A | 11/1994 | Goulet |
| 5,379,343 A | 1/1995 | Grube et al. |
| 5,381,546 A | 1/1995 | Servi et al. |
| 5,381,550 A | 1/1995 | Jourdenais et al. |
| 5,388,062 A | 2/1995 | Knutson |
| 5,388,212 A | 2/1995 | Grube et al. |
| 5,392,960 A | 2/1995 | Kendt et al. |
| 5,437,395 A | 8/1995 | Bull et al. |
| 5,450,557 A | 9/1995 | Kopp et al. |
| 5,454,406 A | 10/1995 | Rejret et al. |
| 5,465,368 A | 11/1995 | Davidson et al. |
| 5,475,856 A | 12/1995 | Kogge |
| 5,479,055 A | 12/1995 | Eccles |
| 5,490,165 A | 2/1996 | Blakeney, II et al. |
| 5,491,823 A | 2/1996 | Ruttenberg |
| 5,507,009 A | 4/1996 | Grube et al. |
| 5,515,519 A | 5/1996 | Yoshioka et al. |
| 5,517,600 A | 5/1996 | Shimokawa |
| 5,519,694 A | 5/1996 | Brewer et al. |
| 5,522,070 A | 5/1996 | Sumimoto |
| 5,530,964 A | 6/1996 | Alpert et al. |
| 5,534,796 A | 7/1996 | Edwards |
| 5,542,265 A | 8/1996 | Rutland |
| 5,553,755 A | 9/1996 | Bonewald et al. |
| 5,555,417 A | 9/1996 | Odnert et al. |
| 5,560,028 A | 9/1996 | Sachs et al. |
| 5,560,038 A | 9/1996 | Haddock |
| 5,570,587 A | 11/1996 | Kim |
| 5,572,572 A * | 11/1996 | Kawan et al. ............... 379/90.01 |
| 5,590,353 A | 12/1996 | Sakakibara et al. |
| 5,594,657 A | 1/1997 | Cantone et al. |
| 5,600,810 A | 2/1997 | Ohkami |
| 5,600,844 A | 2/1997 | Shaw et al. |
| 5,600,845 A * | 2/1997 | Gilson ........................ 712/39 |
| 5,602,833 A | 2/1997 | Zehavi |
| 5,603,043 A | 2/1997 | Taylor et al. |
| 5,607,083 A | 3/1997 | Vogel et al. |
| 5,608,643 A | 3/1997 | Wichter et al. |
| 5,611,867 A | 3/1997 | Cooper et al. |
| 5,619,695 A | 4/1997 | Arbabi et al. |
| 5,623,545 A | 4/1997 | Childs et al. |
| 5,625,669 A | 4/1997 | McGregor et al. |
| 5,626,407 A | 5/1997 | Westcott |
| 5,630,206 A | 5/1997 | Urban et al. |
| 5,635,940 A | 6/1997 | Hickman et al. |
| 5,646,544 A | 7/1997 | Iadanza |
| 5,646,545 A | 7/1997 | Trimberger et al. |
| 5,647,512 A | 7/1997 | Assis Mascarenhas deOliveira et al. |
| 5,667,110 A | 9/1997 | McCann et al. |
| 5,684,793 A | 11/1997 | Kiema et al. |
| 5,684,980 A | 11/1997 | Casselman |
| 5,687,236 A | 11/1997 | Moskowitz et al. |
| 5,694,613 A | 12/1997 | Suzuki |
| 5,694,794 A | 12/1997 | Jerg et al. |
| 5,699,328 A | 12/1997 | Ishizaki et al. |
| 5,701,398 A | 12/1997 | Glier et al. |
| 5,701,482 A | 12/1997 | Harrison et al. |
| 5,704,053 A | 12/1997 | Santhanam |
| 5,706,191 A | 1/1998 | Bassett et al. |
| 5,706,976 A | 1/1998 | Purkey |
| 5,712,996 A | 1/1998 | Schepers |
| 5,720,002 A | 2/1998 | Wang |
| 5,721,693 A | 2/1998 | Song |
| 5,721,854 A | 2/1998 | Ebcioglu et al. |
| 5,729,754 A | 3/1998 | Estes |
| 5,732,563 A | 3/1998 | Bethuy et al. |
| 5,734,808 A | 3/1998 | Takeda |

| | | | | | | |
|---|---|---|---|---|---|---|
| 5,737,631 A | 4/1998 | Trimberger | | 6,023,742 A | 2/2000 | Ebeling et al. |
| 5,742,180 A | 4/1998 | DeHon et al. | | 6,023,755 A | 2/2000 | Casselman |
| 5,742,821 A | 4/1998 | Prasanna | | 6,028,610 A | 2/2000 | Deering |
| 5,745,366 A | 4/1998 | Highma et al. | | 6,036,166 A | 3/2000 | Olson |
| RE35,780 E | 5/1998 | Hassell et al. | | 6,039,219 A | 3/2000 | Bach et al. |
| 5,751,295 A | 5/1998 | Becklund et al. | | 6,041,322 A | 3/2000 | Meng et al. |
| 5,754,227 A | 5/1998 | Fukuoka | | 6,041,970 A | 3/2000 | Vogel |
| 5,758,261 A | 5/1998 | Wiedeman | | 6,046,603 A | 4/2000 | New |
| 5,768,561 A | 6/1998 | Wise | | 6,047,115 A | 4/2000 | Mohan et al. |
| 5,778,439 A | 7/1998 | Trimberger et al. | | 6,052,600 A | 4/2000 | Fette et al. |
| 5,784,636 A | 7/1998 | Rupp | | 6,055,314 A | 4/2000 | Spies et al. |
| 5,787,237 A | 7/1998 | Reilly | | 6,056,194 A | 5/2000 | Kolls |
| 5,790,817 A | 8/1998 | Asghar et al. | | 6,059,840 A | 5/2000 | Click, Jr. |
| 5,791,517 A | 8/1998 | Avital | | 6,061,580 A | 5/2000 | Altschul et al. |
| 5,791,523 A | 8/1998 | Oh | | 6,073,132 A | 6/2000 | Gehman |
| 5,794,062 A | 8/1998 | Baxter | | 6,076,174 A | 6/2000 | Freund |
| 5,794,067 A | 8/1998 | Kadowaki | | 6,078,736 A | 6/2000 | Guccione |
| 5,802,055 A | 9/1998 | Krein et al. | | 6,085,740 A | 7/2000 | Ivri et al. |
| 5,818,603 A | 10/1998 | Motoyama | | 6,088,043 A | 7/2000 | Kelleher et al. |
| 5,819,255 A | 10/1998 | Celis et al. | | 6,091,263 A | 7/2000 | New et al. |
| 5,822,308 A | 10/1998 | Weigand et al. | | 6,091,765 A | 7/2000 | Pietzold, III et al. |
| 5,822,313 A | 10/1998 | Malek et al. | | 6,094,065 A | 7/2000 | Tavana et al. |
| 5,822,360 A | 10/1998 | Lee et al. | | 6,094,726 A | 7/2000 | Gonion et al. |
| 5,828,858 A | 10/1998 | Athanas et al. | | 6,111,893 A | 8/2000 | Volftsun et al. |
| 5,829,085 A | 11/1998 | Jerg et al. | | 6,111,935 A | 8/2000 | Hughes-Hartogs |
| 5,835,753 A | 11/1998 | Witt | | 6,115,751 A | 9/2000 | Tam et al. |
| 5,838,165 A | 11/1998 | Chatter | | 6,119,178 A | 9/2000 | Martin et al. |
| 5,845,815 A | 12/1998 | Vogel | | 6,120,551 A | 9/2000 | Law et al. |
| 5,860,021 A | 1/1999 | Klingman | | 6,122,670 A | 9/2000 | Bennett et al. |
| 5,862,961 A | 1/1999 | Motta et al. | | 6,128,307 A | 10/2000 | Brown |
| 5,870,427 A | 2/1999 | Tiedemann, Jr. et al. | | 6,134,605 A | 10/2000 | Hudson et al. |
| 5,873,045 A | 2/1999 | Lee et al. | | 6,138,693 A | 10/2000 | Matz |
| 5,881,106 A | 3/1999 | Cartier | | 6,141,283 A | 10/2000 | Bogin et al. |
| 5,883,956 A * | 3/1999 | Le et al. ............... 713/170 | | 6,150,838 A | 11/2000 | Wittig et al. |
| 5,884,284 A | 3/1999 | Peters et al. | | 6,154,494 A | 11/2000 | Sugahara et al. |
| 5,886,537 A | 3/1999 | Macias et al. | | 6,157,997 A | 12/2000 | Oowaki et al. |
| 5,887,174 A | 3/1999 | Simons et al. | | 6,173,389 B1 | 1/2001 | Pechanek et al. |
| 5,889,816 A | 3/1999 | Agrawal et al. | | 6,175,854 B1 | 1/2001 | Bretscher |
| 5,889,989 A | 3/1999 | Robertazzi et al. | | 6,175,892 B1 | 1/2001 | Sazzad et al. |
| 5,890,014 A | 3/1999 | Long | | 6,181,981 B1 | 1/2001 | Varga et al. |
| 5,892,900 A | 4/1999 | Ginter et al. | | 6,185,418 B1 | 2/2001 | MacLellan et al. |
| 5,892,961 A | 4/1999 | Trimberger | | 6,192,070 B1 | 2/2001 | Poon et al. |
| 5,892,962 A | 4/1999 | Cloutier | | 6,192,255 B1 | 2/2001 | Lewis et al. |
| 5,894,473 A | 4/1999 | Dent | | 6,192,388 B1 | 2/2001 | Cajolet |
| 5,901,884 A | 5/1999 | Goulet et al. | | 6,195,788 B1 | 2/2001 | Leaver et al. |
| 5,903,886 A | 5/1999 | Heimlich et al. | | 6,198,924 B1 | 3/2001 | Ishii et al. |
| 5,907,285 A | 5/1999 | Toms et al. | | 6,199,181 B1 | 3/2001 | Rechef et al. |
| 5,907,580 A | 5/1999 | Cummings | | 6,202,130 B1 | 3/2001 | Scales, III et al. |
| 5,910,733 A | 6/1999 | Bertolet et al. | | 6,202,189 B1 | 3/2001 | Hinedi et al. |
| 5,912,572 A | 6/1999 | Graf, III | | 6,219,697 B1 | 4/2001 | Lawande et al. |
| 5,913,172 A | 6/1999 | McCabe et al. | | 6,219,756 B1 | 4/2001 | Kasamizugami |
| 5,917,852 A | 6/1999 | Butterfield et al. | | 6,219,780 B1 | 4/2001 | Lipasti |
| 5,920,801 A | 7/1999 | Thomas et al. | | 6,223,222 B1 | 4/2001 | Fijolek et al. |
| 5,931,918 A | 8/1999 | Row et al. | | 6,226,387 B1 | 5/2001 | Tewfik et al. |
| 5,933,642 A | 8/1999 | Greenbaum et al. | | 6,230,307 B1 | 5/2001 | Davis et al. |
| 5,940,438 A | 8/1999 | Poon et al. | | 6,237,029 B1 * | 5/2001 | Master et al. ............... 709/217 |
| 5,949,415 A | 9/1999 | Lin et al. | | 6,246,883 B1 | 6/2001 | Lee |
| 5,950,011 A | 9/1999 | Albrecht et al. | | 6,247,125 B1 | 6/2001 | Noel-Baron et al. |
| 5,950,131 A | 9/1999 | Vilmur | | 6,249,251 B1 | 6/2001 | Chang et al. |
| 5,951,674 A | 9/1999 | Moreno | | 6,258,725 B1 | 7/2001 | Lee et al. |
| 5,953,322 A | 9/1999 | Kimball | | 6,263,057 B1 | 7/2001 | Silverman |
| 5,956,518 A | 9/1999 | DeHon et al. | | 6,266,760 B1 | 7/2001 | DeHon et al. |
| 5,956,967 A | 9/1999 | Kim | | 6,272,579 B1 | 8/2001 | Lentz et al. |
| 5,959,811 A | 9/1999 | Richardson | | 6,272,616 B1 | 8/2001 | Fernando et al. |
| 5,959,881 A | 9/1999 | Trimberger et al. | | 6,281,703 B1 | 8/2001 | Furuta et al. |
| 5,963,048 A | 10/1999 | Harrison et al. | | 6,282,627 B1 | 8/2001 | Wong et al. |
| 5,966,534 A | 10/1999 | Cooke et al. | | 6,289,375 B1 | 9/2001 | Knight et al. |
| 5,970,254 A | 10/1999 | Cooke et al. | | 6,289,434 B1 | 9/2001 | Roy |
| 5,987,105 A | 11/1999 | Jenkins et al. | | 6,289,488 B1 | 9/2001 | Dave et al. |
| 5,987,611 A | 11/1999 | Freund | | 6,292,822 B1 | 9/2001 | Hardwick |
| 5,991,302 A | 11/1999 | Berl et al. | | 6,292,827 B1 | 9/2001 | Raz |
| 5,991,308 A | 11/1999 | Fuhrmann et al. | | 6,292,830 B1 | 9/2001 | Taylor et al. |
| 5,993,739 A | 11/1999 | Lyon | | 6,301,653 B1 | 10/2001 | Mohamed et al. |
| 5,999,734 A | 12/1999 | Willis et al. | | 6,305,014 B1 | 10/2001 | Roediger et al. |
| 6,005,943 A | 12/1999 | Cohen et al. | | 6,311,149 B1 | 10/2001 | Ryan et al. |
| 6,006,249 A | 12/1999 | Leong | | 6,321,985 B1 | 11/2001 | Kolls |
| 6,016,395 A | 1/2000 | Mohamed | | 6,326,806 B1 | 12/2001 | Fallside et al. |
| 6,021,186 A | 2/2000 | Suzuki et al. | | 6,346,824 B1 | 2/2002 | New |
| 6,021,492 A | 2/2000 | May | | 6,347,346 B1 | 2/2002 | Taylor |

| | | |
|---|---|---|
| 6,349,346 B1 * | 2/2002 | Hanrahan et al. ............... 710/9 |
| 6,349,394 B1 | 2/2002 | Brock et al. |
| 6,353,841 B1 | 3/2002 | Marshall et al. |
| 6,356,994 B1 | 3/2002 | Barry et al. |
| 6,359,248 B1 | 3/2002 | Mardi |
| 6,360,256 B1 | 3/2002 | Lim |
| 6,360,259 B1 | 3/2002 | Bradley |
| 6,360,263 B1 | 3/2002 | Kurtzberg et al. |
| 6,363,411 B1 | 3/2002 | Dugan et al. |
| 6,366,999 B1 | 4/2002 | Drabenstott et al. |
| 6,377,983 B1 | 4/2002 | Cohen et al. |
| 6,378,072 B1 | 4/2002 | Collins et al. |
| 6,381,293 B1 | 4/2002 | Lee et al. |
| 6,381,735 B1 | 4/2002 | Hunt |
| 6,385,751 B1 | 5/2002 | Wolf |
| 6,405,214 B1 | 6/2002 | Meade, II |
| 6,408,039 B1 | 6/2002 | Ito |
| 6,410,941 B1 | 6/2002 | Taylor et al. |
| 6,411,612 B1 | 6/2002 | Halford et al. |
| 6,421,372 B1 | 7/2002 | Bierly et al. |
| 6,421,809 B1 | 7/2002 | Wuytack et al. |
| 6,426,649 B1 | 7/2002 | Fu et al. |
| 6,430,624 B1 | 8/2002 | Jamtgaard et al. |
| 6,433,578 B1 | 8/2002 | Wasson |
| 6,434,590 B1 | 8/2002 | Blelloch et al. |
| 6,438,737 B1 | 8/2002 | Morelli et al. |
| 6,446,258 B1 | 9/2002 | McKinsey et al. |
| 6,449,747 B2 | 9/2002 | Wuytack et al. |
| 6,456,996 B1 | 9/2002 | Crawford, Jr. et al. |
| 6,459,883 B2 | 10/2002 | Subramanian et al. |
| 6,467,009 B1 | 10/2002 | Winegarden et al. |
| 6,469,540 B2 | 10/2002 | Nakaya |
| 6,473,609 B1 | 10/2002 | Schwartz et al. |
| 6,483,343 B1 | 11/2002 | Faith et al. |
| 6,507,947 B1 | 1/2003 | Schreiber et al. |
| 6,510,138 B1 | 1/2003 | Pannell |
| 6,510,510 B1 | 1/2003 | Garde |
| 6,538,470 B1 | 3/2003 | Langhammer et al. |
| 6,556,044 B1 | 4/2003 | Langhammer et al. |
| 6,563,891 B1 | 5/2003 | Eriksson et al. |
| 6,570,877 B1 | 5/2003 | Kloth et al. |
| 6,577,678 B2 | 6/2003 | Scheuermann |
| 6,587,684 B1 | 7/2003 | Hsu et al. |
| 6,590,415 B2 | 7/2003 | Agrawal et al. |
| 6,601,086 B1 | 7/2003 | Howard et al. |
| 6,601,158 B1 | 7/2003 | Abbott et al. |
| 6,604,085 B1 | 8/2003 | Kolls |
| 6,604,189 B1 | 8/2003 | Zemlyak et al. |
| 6,606,529 B1 | 8/2003 | Crowder, Jr. et al. |
| 6,615,333 B1 | 9/2003 | Hoogerbrugge et al. |
| 6,618,434 B2 | 9/2003 | Heidari-Bateni et al. |
| 6,640,304 B2 | 10/2003 | Ginter et al. |
| 6,647,429 B1 | 11/2003 | Semal |
| 6,653,859 B2 | 11/2003 | Sihlbom et al. |
| 6,675,265 B2 | 1/2004 | Barroso et al. |
| 6,675,284 B1 | 1/2004 | Warren |
| 6,691,148 B1 | 2/2004 | Zinky et al. |
| 6,694,380 B1 | 2/2004 | Wolrich et al. |
| 6,711,617 B1 | 3/2004 | Bantz et al. |
| 6,718,182 B1 | 4/2004 | Kung |
| 6,718,541 B2 | 4/2004 | Ostanevich et al. |
| 6,721,286 B1 | 4/2004 | Williams et al. |
| 6,721,884 B1 | 4/2004 | De Oliveira Kastrup Pereira et al. |
| 6,732,354 B2 | 5/2004 | Ebeling et al. |
| 6,735,621 B1 | 5/2004 | Yoakum et al. |
| 6,738,744 B2 | 5/2004 | Kirovski et al. |
| 6,748,360 B2 | 6/2004 | Pitman et al. |
| 6,751,723 B1 | 6/2004 | Kundu et al. |
| 6,754,470 B2 | 6/2004 | Hendrickson et al. |
| 6,760,587 B2 | 7/2004 | Holtzman et al. |
| 6,760,833 B1 | 7/2004 | Dowling |
| 6,766,165 B2 | 7/2004 | Sharma et al. |
| 6,778,212 B1 | 8/2004 | Deng et al. |
| 6,785,341 B2 | 8/2004 | Walton et al. |
| 6,810,527 B1 * | 10/2004 | Conrad et al. ............... 725/76 |
| 6,819,140 B2 | 11/2004 | Yamanaka et al. |
| 6,823,448 B2 | 11/2004 | Roth et al. |
| 6,829,633 B2 | 12/2004 | Gelfer et al. |
| 6,832,250 B1 | 12/2004 | Coons et al. |
| 6,836,839 B2 | 12/2004 | Master et al. |
| 6,859,434 B2 | 2/2005 | Segal et al. |
| 6,865,664 B2 | 3/2005 | Budrovic et al. |
| 6,871,236 B2 | 3/2005 | Fishman et al. |
| 6,883,084 B1 | 4/2005 | Donohoe |
| 6,894,996 B2 | 5/2005 | Lee |
| 6,901,440 B1 | 5/2005 | Bimm et al. |
| 6,912,515 B2 | 6/2005 | Jackson et al. |
| 6,941,336 B1 | 9/2005 | Mar |
| 6,980,515 B1 | 12/2005 | Schunk et al. |
| 6,985,517 B2 | 1/2006 | Matsumoto et al. |
| 6,986,021 B2 * | 1/2006 | Master et al. ............... 712/15 |
| 6,986,142 B1 | 1/2006 | Ehlig et al. |
| 6,988,139 B1 | 1/2006 | Jervis et al. |
| 7,032,229 B1 | 4/2006 | Flores et al. |
| 7,044,741 B2 | 5/2006 | Leem |
| 7,082,456 B2 | 7/2006 | Mani-Meitav et al. |
| 7,139,910 B1 | 11/2006 | Ainsworth et al. |
| 7,142,731 B1 | 11/2006 | Toi |
| 7,249,242 B2 | 7/2007 | Ramchandran |
| 7,304,677 B2 * | 12/2007 | Keelan et al. ............ 348/333.01 |
| 2001/0003191 A1 | 6/2001 | Kovacs et al. |
| 2001/0019613 A1 * | 9/2001 | Dillon et al. ............... 380/240 |
| 2001/0023482 A1 | 9/2001 | Wray |
| 2001/0029515 A1 | 10/2001 | Mirsky |
| 2001/0034795 A1 | 10/2001 | Moulton et al. |
| 2001/0039654 A1 | 11/2001 | Miyamoto |
| 2001/0048713 A1 | 12/2001 | Medlock et al. |
| 2001/0048714 A1 | 12/2001 | Jha |
| 2001/0050948 A1 | 12/2001 | Ramberg et al. |
| 2002/0010848 A1 | 1/2002 | Kamano et al. |
| 2002/0013799 A1 | 1/2002 | Blaker |
| 2002/0013937 A1 | 1/2002 | Ostanevich et al. |
| 2002/0015435 A1 | 2/2002 | Rieken |
| 2002/0015439 A1 | 2/2002 | Kohli et al. |
| 2002/0023210 A1 | 2/2002 | Tuomenoksa et al. |
| 2002/0024942 A1 | 2/2002 | Tsuneki et al. |
| 2002/0024993 A1 | 2/2002 | Subramanian et al. |
| 2002/0031166 A1 * | 3/2002 | Subramanian et al. ....... 375/130 |
| 2002/0032551 A1 | 3/2002 | Zakiya |
| 2002/0035560 A1 * | 3/2002 | Sone ............... 707/5 |
| 2002/0035623 A1 | 3/2002 | Lawande et al. |
| 2002/0041581 A1 | 4/2002 | Aramaki |
| 2002/0042907 A1 | 4/2002 | Yamanaka et al. |
| 2002/0061741 A1 | 5/2002 | Leung et al. |
| 2002/0069282 A1 | 6/2002 | Reisman |
| 2002/0072830 A1 | 6/2002 | Hunt |
| 2002/0078229 A1 * | 6/2002 | Lindemann et al. ......... 709/238 |
| 2002/0078337 A1 | 6/2002 | Moreau et al. |
| 2002/0083305 A1 | 6/2002 | Renard et al. |
| 2002/0083423 A1 | 6/2002 | Ostanevich et al. |
| 2002/0087829 A1 | 7/2002 | Snyder et al. |
| 2002/0089348 A1 | 7/2002 | Langhammer |
| 2002/0101909 A1 | 8/2002 | Chen et al. |
| 2002/0107905 A1 | 8/2002 | Roe et al. |
| 2002/0107962 A1 | 8/2002 | Richter et al. |
| 2002/0119803 A1 | 8/2002 | Bitterlich et al. |
| 2002/0120672 A1 | 8/2002 | Butt et al. |
| 2002/0133688 A1 | 9/2002 | Lee et al. |
| 2002/0138716 A1 | 9/2002 | Master et al. |
| 2002/0141489 A1 | 10/2002 | Imaizumi |
| 2002/0147845 A1 | 10/2002 | Sanchez-Herrero et al. |
| 2002/0159503 A1 | 10/2002 | Ramachandran |
| 2002/0162026 A1 | 10/2002 | Neuman et al. |
| 2002/0168018 A1 | 11/2002 | Scheuermann |
| 2002/0181559 A1 | 12/2002 | Heidari-Bateni et al. |
| 2002/0184275 A1 | 12/2002 | Dutta et al. |
| 2002/0184291 A1 | 12/2002 | Hogenauer |
| 2002/0184498 A1 | 12/2002 | Qi |
| 2002/0184653 A1 * | 12/2002 | Pierce et al. ............... 725/143 |
| 2002/0191790 A1 | 12/2002 | Anand et al. |
| 2003/0007606 A1 | 1/2003 | Suder et al. |
| 2003/0012270 A1 | 1/2003 | Zhou et al. |
| 2003/0018446 A1 | 1/2003 | Makowski et al. |
| 2003/0018700 A1 | 1/2003 | Giroti et al. |
| 2003/0023830 A1 | 1/2003 | Hogenauer |
| 2003/0026242 A1 | 2/2003 | Jokinen et al. |
| 2003/0030004 A1 | 2/2003 | Dixon et al. |
| 2003/0046421 A1 | 3/2003 | Horvitz et al. |

| | | | |
|---|---|---|---|
| 2003/0061260 A1 | 3/2003 | Rajkumar | |
| 2003/0061311 A1 | 3/2003 | Lo | |
| 2003/0063656 A1 | 4/2003 | Rao et al. | |
| 2003/0074473 A1 | 4/2003 | Pham et al. | |
| 2003/0076815 A1 | 4/2003 | Miller et al. | |
| 2003/0099223 A1 | 5/2003 | Chang et al. | |
| 2003/0102889 A1 | 6/2003 | Master et al. | |
| 2003/0105949 A1 | 6/2003 | Master et al. | |
| 2003/0110485 A1 | 6/2003 | Lu et al. | |
| 2003/0142818 A1 | 7/2003 | Raghunathan et al. | |
| 2003/0154357 A1 | 8/2003 | Master et al. | |
| 2003/0163723 A1 | 8/2003 | Kozuch et al. | |
| 2003/0172138 A1 | 9/2003 | McCormack et al. | |
| 2003/0172139 A1 | 9/2003 | Srinivasan et al. | |
| 2003/0200538 A1* | 10/2003 | Ebeling et al. | 717/160 |
| 2003/0212684 A1 | 11/2003 | Meyer et al. | |
| 2003/0229864 A1 | 12/2003 | Watkins | |
| 2004/0006584 A1 | 1/2004 | Vandeweerd | |
| 2004/0010645 A1 | 1/2004 | Scheuermann et al. | |
| 2004/0015970 A1 | 1/2004 | Scheuermann | |
| 2004/0015973 A1 | 1/2004 | Skovira | |
| 2004/0025159 A1 | 2/2004 | Scheuermann et al. | |
| 2004/0057505 A1 | 3/2004 | Valio | |
| 2004/0062300 A1 | 4/2004 | McDonough et al. | |
| 2004/0081248 A1 | 4/2004 | Parolari | |
| 2004/0093479 A1 | 5/2004 | Ramchandran | |
| 2004/0168044 A1 | 8/2004 | Ramchandran | |
| 2005/0044344 A1 | 2/2005 | Stevens | |
| 2005/0166038 A1 | 7/2005 | Wang et al. | |
| 2005/0198199 A1 | 9/2005 | Dowling | |
| 2006/0031660 A1 | 2/2006 | Master et al. | |

FOREIGN PATENT DOCUMENTS

| | | |
|---|---|---|
| EP | 0 301 169 A1 | 2/1989 |
| EP | 0 166 586 B1 | 1/1991 |
| EP | 0 236 633 B1 | 5/1991 |
| EP | 0 478 624 B1 | 4/1992 |
| EP | 0 479 102 A2 | 4/1992 |
| EP | 0 661 831 A2 | 7/1995 |
| EP | 0 668 659 A2 | 8/1995 |
| EP | 0 690 588 A2 | 1/1996 |
| EP | 0 691 754 A2 | 1/1996 |
| EP | 0 768 602 A2 | 4/1997 |
| EP | 0 817 003 A2 | 1/1998 |
| EP | 0 821 495 A2 | 1/1998 |
| EP | 0 866 210 A2 | 9/1998 |
| EP | 0 923 247 A2 | 6/1999 |
| EP | 0 926 596 A2 | 6/1999 |
| EP | 1 056 217 A2 | 11/2000 |
| EP | 1 061 437 A1 | 12/2000 |
| EP | 1 061 443 A2 | 12/2000 |
| EP | 1 126 368 A2 | 8/2001 |
| EP | 1 150 506 A2 | 10/2001 |
| EP | 1 189 358 A1 | 3/2002 |
| GB | 2 067 800 A | 7/1981 |
| GB | 2 237 908 A | 5/1991 |
| JP | 62-249456 | 10/1987 |
| JP | 63-147258 | 6/1988 |
| JP | 4-51546 | 2/1992 |
| JP | 7-064789 | 3/1995 |
| JP | 7066718 | 3/1995 |
| JP | 10233676 | 9/1998 |
| JP | 10254696 | 9/1998 |
| JP | 11296345 | 10/1999 |
| JP | 2000315731 | 11/2000 |
| JP | 2001-053703 | 2/2001 |
| WO | WO 89/05029 A1 | 6/1989 |
| WO | WO 89/11443 A2 | 11/1989 |
| WO | WO 91/00238 A1 | 1/1991 |
| WO | WO 93/13603 A1 | 1/1991 |
| WO | WO 95/11855 A1 | 5/1995 |
| WO | WO 96/33558 A1 | 10/1996 |
| WO | WO 98/32071 A3 | 7/1998 |
| WO | WO 99/03776 A1 | 1/1999 |
| WO | WO 99/21094 A2 | 4/1999 |
| WO | WO 99/26860 A1 | 6/1999 |
| WO | WO 99/65818 A1 | 12/1999 |
| WO | WO 00/19311 A1 | 4/2000 |
| WO | WO 00/65855 A1 | 11/2000 |
| WO | WO 00/69073 A1 | 11/2000 |
| WO | WO 01/11281 A1 | 2/2001 |
| WO | WO 01/22235 A1 | 3/2001 |
| WO | WO 01/76129 A2 | 10/2001 |
| WO | WO 02/12978 A2 | 2/2002 |

OTHER PUBLICATIONS

Aggarwal et al., "Efficient Huffman Decoding," International Conference on Image Processing IEEE 1:936-939 (Sep. 10-13, 2000).

Allan et al., "Software Pipelining," ACM Computing Surveys, 27(3):1-78 (Sep. 1995).

Alsolaim et al., "Architecture and Application of a Dynamically Reconfigurable Hardware Array for Future Mobile Communication Systems," Field Programmable Custom Computing Machines, 2000 IEEE Symposium, Napa Valley, Los Alamitos, CA. IEEE Comput. Soc. pp. 205-214 (Apr. 17-19, 2000).

Ashenden et al., "The VHDL Cookbook," Dept. Computer Science, University of Adelaide, South Australia. Downloaded from http://tams-www.informatik.uni-hamburg.de/vhdl/doc/cookbook/VHDL-Cookbook.pdf on Dec. 7, 2006 (Jul. 1990).

Bacon et al., "Compiler Transformations for High-Performance Computing," ACM Computing Surveys 26(4):368-373 (Dec. 1994).

Balasubramonian et al., "Reducing the Complexity of the Register File in Dynamic Superscalar Processors," Proceedings of the 34th Annual ACM/IEEE International Symposium on Microarchitecture, pp. 237-248 (Dec. 1, 2001).

Banerjee et al., "A MATLAB Compiler for Distributed, Heterogeneous, Reconfigurable Computing Systems," 2000 IEEE Symposium, pp. 39-48, (Apr. 17-19, 2000).

Bapte et al, "Uniform Execution Environment for Dynamic Reconfiguration," Darpa Adaptive Computing Systems, http://isis.vanderbilt.edu/publications/archive/babty_T_#_0_1999_Uniform_Ex.pdf, pp. 1-7 (1999).

Baumgarte et al, "PACT XPP—A Self-Reconfigurable Data Processing Architecture," NN www.pactcorp.com/sneu/download/ersa01.pdf; retrieved on Nov. 25, 2005 (Jun. 25, 2001).

Becker et al., "An Application-Tailored Dynamically Reconfigurable Hardware Architecture for Digital Baseband Processing," IEEE Conference Proceedings Article pp. 341-346 (Sep. 18, 2000).

Becker et al., "Design and Implementation of a Coarse-Grained Dynamically Reconfigurable Hardware Architecture," VLSI 2001, Proceedings IEEE Computer Soc. Workshop, Piscataway, NJ, USA, pp. 41-46 (Apr. 19-20, 2001).

Bevstar, BevStar Bottled Water Model Advertisement *Automatic Merchandiser* at www.AMonline.com (2005).

Bevstar, BevStar Point of Use Water Model Advertisement *Automatic Merchandiser* at www.AMonline.com (2005).

Bishop & Loucks, "A Heterogeneous Environment for Hardware/Software Cosimulation," Proceedings of the 30th Annual Simulation Symposium, pp. 14-22 (Apr. 7-9, 1997).

Brakensiek et al., "Re-Configurable Multi-Standard Terminal for Heterogeneous Networks," Radio and Wireless Conference, Rawcon 2002 IEEE. pp. 27-30 (2002).

Brown et al., "Quick PDA Data Exchange," PC Magazine pp. 1-3 (May 22, 2001).

Buck et al., "Ptolemy: A Framework for Simulating and Prototyping Heterogeneous Systems," International Journal of Computer Simulation 4:155-182 (Apr. 1994).

Burns et al., "A Dynamic Reconfiguration Run-Time System," Proceedings of the 5th Annual Symposium on Field-Programmable Custom Computing Machines, pp. 166-175 (Apr. 16, 1997).

Business Wire, "Whirlpool Internet-Enabled Appliances to Use Beeline Shopper Software Features," http://www.whirlpoocorp.com/news/releases/release.asp?rid=90 (Feb. 16, 2001).

Buttazzo et al., "Optimal Deadline Assignment for Scheduling Soft Aperiodic Tasks in Hard Real-Time Environments," Engineering of Complex Computer Systems, Proceedings of the Third IEEE International Conference on Como, pp. 39-48 (Sep. 8, 1997).

Callahan et al., "Adapting Software Pipelining for Reconfigurable Computing," in Proceedings of the International Conference on Compilers, Architectrue and Synthesis for Embedded Systems p. 8, ACM (CASES '00, San Jose, CA) (Nov. 17-18, 2000).

Chapman & Mehrotra, "OpenMP and HPF: Integrating Two Paradigms," Proceedings of the 4th International Euro-Par Conference (Euro-Par'98), Springer-Verlag Heidelberg, Lecture Notes in Computer Science 1470:650-658 (1998).

Chen et al., "A Reconfigurable Multiprocessor IC for Rapid Prototyping of Algorithmic-Specific High-Speed DSP Data Paths," IEEE Journal of Solid-State Circuits, IEEE 35:74-75 (Feb. 1, 2001).

Clarke, "Embedded Solutions Enters Development Pact with Marconi," EETimes Online (Jan. 26, 2000).

Compton & Hauck, "Reconfigurable Computing: A Survey of Systems and Software," ACM Press, ACM Computing Surveys (CSUR) 34(2):171-210 (Jun. 2002).

Compton et al., "Configuration Relocation and Defragmentation for Run-Time Reconfigurable Computing," Northwestern University, http://citeseer.nj.nec.com/compton00configuration.html, pp. 1-17 (2000).

Conte et al., "Dynamic Rescheduling: A Technique for Object Code Compatibility in VLIW Architectures," Proceedings of the 28th Annulal International Symposium on Microarchitecture pp. 208-218 (Nov. 29, 1995).

Conte et al., "Instruction Fetch Mechanisms for VLIW Architectures with Compressed Encodings," Proceedings of the Annual IEEE/ACM International Symposium on Microarchitecture (MICRO) 29:201-211 (Dec. 2, 1996).

Cray Research Inc., "Cray T3E Fortran Optimization Guide," Ver. 004-2518-002, Section 4.5 (Jan. 1999).

Cummings et al., "FPGA in the Software Radio," IEEE Communications Magazine . 37(2):108-112 (Feb. 1999).

Dandalis et al., "An Adaptive Cryptograhic Engine for IPSec Architectures," IEEE pp. 132-141 (Jan. 2000).

David et al., "DART: A Dynamically Reconfigurable Architecture Dealing with Future Mobile Telecommunication Constraints," Proceedings of the International Parallel and Distributed Processing Symposium pp. 156-163 (Apr. 15, 2002).

Deepakumara et al., "FPGA Implementation of MD5 has Algorithm," Canadian Conference on Electrical and Computer Engineering, IEEE (2001).

Dehon et al., "Reconfigurable Computing: What, Why and Implications for Design Automation," Design Automation Conference Proceedings pp. 610-615 (1999).

Dipert, "Figuring Out Reconfigurable Logic," EDN 44(16):107-114 (Aug. 5, 1999).

Dominikus, "A Hardware Implementation of MD4-Family Hash Algorithms," 9th International Conference on Electronics, Circuits and Systems IEEE (2002).

Dorband, "aCe C Language Reference Guide," Online (Archived Mar. 2001), http://web.archive.org/web/20000616053819/http://newton.gsfc.nasa.gov/aCe/aCe_dir/aCe_cc_Ref.html (Mar. 2001).

Drozdowski, "Scheduling Multiprocessor Tasks—An Overview," Instytut Informatyki Politechnika, pp. 1-31 (Jan. 31, 1996).

Ebeling et al., "RaPiD Reconfigurable Pipelined Datapath," Springer-Verlag, 6th International Workshop on Field-Programmable Logic and Applications pp. 126-135 (1996).

Fawer et al., "A Multiprocessor Approach for Implementing a Time-Diversity Spread Specturm Receiver," Proceeding sof the 1990 International Zurich Seminal on Digital Communications, pp. 173-180 (Mar. 5-8, 1990).

Fisher, "Gone Flat," Forbes pp. 76-79 (Oct. 2001).

Fleischmann et al., "Prototyping Networked Embedded Systems," Integrated Engineering, pp. 116-119 (Feb. 1999).

Forbes "Best of the Web— Computer Networking/Consumer Durables," The Forbes Magnetic 40 p. 80 (May 2001).

Gibson, "Fresh Technologies Will Create Myriad Functions," FT Information Technology Review; World Wide Web at http://technews.acm.org/articles/2000-2/0301w.
html?searchterm=%22fresh+technologies%22 (Mar. 1, 2000).

Gluth, "Integrierte Signalprozessoren," Elektronik 35(18):112-118 Franzis Verlag GMBH, Munich, German (Sep. 5, 1986).

Gokhale & Schlesinger, "A Data Parallel C and Its Platforms," Proceedings of the Fifth Symposium on the Frontiers of Massively Parallel Computation pp. 194-202 (Frontiers '95) (Feb. 1995).

Grimm et al., "A System Architecture for Pervasive Computing," Washington University, pp. 1-6 (Sep. 2000).

Halbwachs et al., "The Synchronous Data Flow Programming Language LUSTRE," Proceedings of the IEEE 79(9):1305-1319 (Sep. 1991).

Hammes et al., "Cameron: High Level Language Compilation for Reconfigurable Systems," Proc. of the Intl. Conf. on Parallel Architectures and Compilation Techniques, pp. 236-244 (Oct. 1999).

Hartenstein, "Coarse Grain Reconfigurable Architectures," Design Automation Conference, 2001. Proceeding of the ASP-Dac 2001, Asian and South Pacific Jan. 30, 2001-Feb. 2, 2001, Piscataway, NJ, US, IEEE, pp. 564-569 (Jan. 30, 2001).

Heinz, "An Efficiently Compilable Extension of {M}odula-3 for Problem-Oriented Explicitly Parallel Programming," Proceedings of the Joint Symposium on Parallel Processing (May 1993).

Hinden et al., "The DARPA Internet: Interconnecting Heterogeneous Computer Networks with Gateways," IEEE Computer Magazine pp. 38-48 (1983).

Horton, "Beginning Java 2: JDK 1.3 Edition," Wrox Press, Chapter 8, pp. 313-316 (Feb. 2001).

Huff et al., "Lifetime-Sensitive Modulo Scheduling," 6th Conference on Programming Language, Design and Implementation, pp. 258-267, ACM (1993).

IBM, "Multisequencing a Single Instruction Stream Scheduling with Space-time Trade-offs," IBM Technical Disclosure Bulletin 36(2):105-108 (Feb. 1, 1993).

IEEE, "IEEE Standard Verilog Hardware Description Language," downloaded from http://inst.eecs.berkeley.edu/~cs150/fa06/Labs/verilog-ieee.pdf on Dec. 7, 2006 (Sep. 2001).

Internet Wire, Sunbeam Joins Microsoft in University Plug and Play Forum to Establish A "Universal" Smart Appliance Technology Standard (Mar. 23, 2000).

Ishii et al., "Parallel Variable Length Decoding with Inverse Quantization for Software MPEG-2 Decoders," Workshop on Signal Processing Systems, Design and Implementation, IEEE pp. 500-509 (Nov. 3-5, 1997).

Isoworth, "Isoworth Beverage Dispensing Technology Worldwide Company," Brochure (May 22, 2000).

Jain et al., "An Alternative Approach Towards the Design of Control Units," Microelectronics and Reliability 24(6):1009-1012 (1984).

Jain, "Parallel Processing with the TMS320C40 Parallel Digital Signal Processor," Sonitech International Inc., pp. 13-46. Retrieved from: http://www-s.ti.com/sc/psheets/spra031/spra031.pdf retrieved on Apr. 14, 2004 (Feb. 1994).

Janssen et al., "Partitioned Register File for TTAs," Proceedings of the 28th Annual International Symposium on Microarchitecture, pp. 303-312 (Nov. 1995).

Jong-Pyng et al., "Real-Time Virtual Channel Flow Control," Proceedings of the Annual International Phoenix Conference on Computers and Communications, Conf. 13, pp. 97-103 (Apr. 12, 1994).

Jung et al., "Efficient Hardware Controller Synthesis for Synchronous Dataflow Graph in System Level Design," Proceedings of the 13th International Symposium on System Synthesis pp. 79-84 (ISSS'00) (Sep. 2000).

Kaufmann et al., "Digital Spread-Spectrum Multipath-Diversity Receiver for Indoor Communication," from Pioneers to the 21st Century; Denver, Proceedings of the •Vehicular Technology Socity [sic] Conference, NY, IEEE, US 2(Conf. 42):1038-1041 (May 10-13, 1992).

Kneip et al., "An Algorithm Adapted Autonomous Controlling Concept for a Parallel Single-Chip Digital Signal Processor," Journal of VLSI Signal Processing Systems for Signal, Image, an dVideo Technology 16(1):31-40 (May 1, 1997).

Lee & Messerschmitt, "Pipeline Interleaved Programmable DSP's: Synchronous Data Flow Programming," IEEE Transactions on Acoustics, Speech, and Signal Processing ASSP-35(9):1334-1345 (Sep. 1987).

Lee & Messerschmitt, "Synchronous Data Flow," Proceedings of the IEEE 75(9):1235-1245 (Sep. 1987).

Lee & Parks, "Dataflow Process Networks," Proceedings of the IEEE 83(5):773-799 (May 1995).

Liu et al., "Scheduling Algorithms for Multiprogramming in a Hard-Real-Time Environment," *Journal of the Association for Computing* 20(1):46-61 (1973).

Llosa et al., "Lifetime-Sensitive Modulo Scheduling in a Production Environment," IEEE Trans. on Comps. 50(3):234-249 (Mar. 2001).

Lu et al., "The Morphosys Dynamically Reconfigurable System-On-Chip," Proceedings of the First NASA/DOD Workshop on Evolvable Hardware, pp. 152-160 (Jul. 19, 1999).

Mangione-Smith et al., "Seeking Solutions in Configurable Computing," *Computer* 30(12):38-43 (Dec. 1997).

Manion, "Network CPU Adds Spice," Electronic Engineering Times, Issue 1126 (Aug. 14, 2000).

Mascia & Ishii., "Neural Net Implementation on Single-Chip Digital Signal Processor," IEEE (1989).

McGraw, "Parallel Functional Programming in Sisal: Fictions, Facts, and Future," Lawrence Livermore National Laboratory pp. 1-40 (Jul. 1993).

Najjar et al., "High-Level Language Abstraction for Reconfigurable Computing," *Computer* 36(8):63-69 (Aug. 2003).

Nichols et al., "Data Management and Control-Flow Constructs in a SIMD/SPMD Parallel Language/Compiler," Proceedings of the 3rd Symposium on the Frontiers of Massively Parallel Computation pp. 397-406 (Oct. 1990).

OpenMP Architecture Review Board, "OpenMP C and C++ Application Program Interface," pp. 7-16 (Oct. 1998).

Oracle Corporation, "Oracle8i JDBC Developer's Guide and Reference," Release 3, 8.1.7, pp. 10-8-10-10 (Jul. 2000).

Pauer et al., "Algorithm Analysis and Mapping Environment for Adaptive Computing Systems: Further Results," Proc. IEEE Symposium on FPGA's for Custom Computing Machines (FCCM), Napa CA (1999).

Pauer et al., "Algorithm Analysis and Mapping Environment for Adaptive Computing Systems," Presentation slides, Third Bi-annual Ptolemy Miniconference (1999).

Ramamritham et al., "On Scheduling Algorithms for Real-Time Multiprocessor Systems," Algorithms and Applications, Proceedings of the International conference on Parallel Processing 3:143-152 (Aug. 8, 1989).

Schneider, "A Parallel/Serial Trade-Off Methodology for Look-Up Table Based Decoders," Proceedings of the Design Automation Conference 34:498-503 (Jun. 9-13, 1997).

Sidhu et al., "A Self-Reconfigurable Gate Array Architecture," 10 International Workshop on Field Programmable Logic and Applications http://coblitz.codeen.org:3125/citeseer.ist.psu.edu/cache/papers/cs/17524/http:zSzzSzmaarcii.usc.eduzSzPublicationsZSzsidhu_fp100.pdf/sidhu00selfreconfigurable.pdf retrieved on Jun. 21, 2006 (Sep. 1, 2001).

Smith, "Intro to ASICs: ASIC Cell Libraries," at http://iroi.seu.edu.cn/books/asics/Book2/CH01/CH01.5.htm, printed on Feb. 4, 2005 (Jun. 1997).

Souza, "Computing's New Face—Reconfigurable Devices Could Rattle Supply Chain," Electronic Buyers' News Issue 1205, p. P.1 (Apr. 3, 2000).

Souza, "Quicksilver Buys White Eagle," Electronic Buyers News, Issue 1220 (Jul. 17, 2000).

Sriram et al., "MPEG-2 Video Decoding on the TMS320C6X DSP Architecture," Conference Record of the 32nd Asilomar Conference on Signals, Systems, and Computers, IEEE pp. 1735-1739 (Nov. 1-4, 1998).

Steiner, "Coke Chiefs Latest Daft Idea—A Cola Tap in Every House," Sunday Times (Mar. 2001).

Sun Microsystems, "FORTRAN 3.0.1 User's Guide, Revision A," pp. 57-68 (Aug. 1994).

Svensson, "Co's Join On Home Web Wiring Network," Associated Press Online printed on Apr. 30, 2008 (Jun. 2000).

Tang et al., "Thread Partitioning and Scheduling Based on Cost Model," Proceedings of the Ninth Annual ACM Symposium on Parallel Algorithms and Architectures, pp. 272-281 Retrieved from: http://doi.acm.org/10.1145/258492.2585 retrieved on Aug. 25, 2004 (1997).

Vaya, "VITURBO: A Reconfigurable Architecture for Ubiquitous Wireless Networks," A Thesis Submitted in Partial Fulfillment of the Requirements for the Degree Master of Science; Rice University (Aug. 2002).

Wang et al., "Cell Search in W-CDMA," IEEE Journal on Selected Areas in Communications 18(8):1470-1482 (Aug. 2000).

Wardell, "Help for Hurried Cooks?," Popular Science, p. 32 (May 2000).

Whiting & Pascoe, "A History of Data-Flow Languages," IEEE Annals of the History of Computing 16(4):38-59 (1994).

Williamson & Lee, "Synthesis of Parallel Hardware Implementations from Synchronous Dataflow Graph Specifications," Conference Record of the Thirtieth Asilomar Conference on Signals, Systems and Computers 1340-1343 (Nov. 1996).

Wirthlin et al., "A Dynamic Instruction Set Computer," Proceedings of the IEEE Symposium on FPGA's for Custom Computing Machines, pp. 99-107 (Apr. 21, 1995).

WWW.APPLIANCEMAGAZINE.COM, World Wide Web at http://web.archive.org/web/20000511085402/http://www.appliancemagazine.com/ printed on Apr. 30, 2008.

WWW.BESTROM.COM, BreakMateTM from www.bestrom.com printed on Apr. 29, 2008.

WWW.BEVERAGEEXPRESS.COM, Beverage Express from www.beverageexpress.com printed on Apr. 30, 2008.

WWW.BEVSTAR.COM, Isoworth Beverage Dispensing Technology Worldwide from www.bevstar.com printed on Apr. 30, 2008.

WWW.BONATOR.COM, from The World Wide Web at http://web.archive.org/web/20000510102440/http://www.bonator.com/ printed on Apr. 30, 2008.

WWW.ECOMMERCE.DEWPOINTINC.COM, Swiss Mountain Coffees from www.ecommerce.dewpointinc.com printed on Apr. 30, 2008.

WWW.GATEWAY.COM, World Wide Web, http://web.archive.org/web/20000229192734/www.gateway.com/productpages/9300splash/index.shtml Available on Mar. 3, 2000, 1 page (Mar. 3, 2000).

WWW.ICL.COM, from the World Wide Web at http://www.icl.com printed on Apr. 30, 2008.

WWW.MARGHERITA2000.COM; from Margherita2000.com printed Apr. 30, 2008 (Jan. 26, 2001).

WWW.SODACLUBENTERPRISES, Soda-Club Enterprises from www.sodaclubenterprises.com printed on Apr. 30, 2008.

WWW.SYMBOL.COM, Symbol from www.symbol.com printed on Apr. 30, 2008.

WWW.WUNDERBAR.COM, Wunder-Bar Dispensing Systems from www.wunderbar.com printed on Apr. 30, 2008.

Xilinx, "Virtex-II Pro Platform FPGAs: Functional Description DS083-2 (v2.5)," Product Specification, pp. 13-46 (Jan. 20, 2003).

Young, "Architecture Powers up IPSec, SSL," EETimes, Los Gatos, CA, pp. 1-4 http://www.eetimes.com/story/OEG20011102S0065 (Nov. 2, 2001).

Yuan et al., "A Decomposition Approach to Non-Preemptive Real-Time Scheduling," Real Time Systems 6(1):7-35 (1994).

Zaino et al., "Algorithm Analysis and Mapping Environment for Adaptive Computing Systems," Final Technical Report, DARPA Contract F33615-97-C-1174 (Sep. 2001).

Zhang et al., "A 1V Heterogeneous Reconfigurable Processor IC for Baseband Wireless Applications," 2000 IEEE Solid.

Altera Apex 20K 1999.

Andraka Consulting Group, "Distributed Arithmetic," Obtained from: http://www.fpga-guru.com/distribu.htm (1998-2000).

Free On-Line Dictionary of Computing. © 1995-2000 www.foldoc.org search terms: cache, operating system, Internet, DMA, interrupt.

Hanna et al., "A Normalized Backpropagation Learning Algorithm for Multilayer Feed-Forward Neural Adaptive Filters," *Neural Networks for Signal Processing XI*, Proceedings of the 2001 IEEE Signal Processing Society Workshop pp. 63-72 (Sep. 2001).

Janweijer et al., "A Compact Robin Using the SHarc (CRUSH)," Obtained from: http://www.nikhef.nl/~peterj/Crush/CRUSH-hw.pdf (Sep. 1998).

Rajagopalan et al., "A Flexible Multiplication Unit for an FPGA Logic Block," *Circuits and Systems* 4:546-9 (2001).

Röch et al., "Some New Results in Flow Shop Scheduling," Zeitschrift für Operations Research 28:1-16 (1983).
Verhoosel et al., "A Static Scheduling Algorithm for Distributed Hard Real-Time Systems," *Journal of Real-Time Systems* 3:227-46 (1991).
Xilinx Data Book 1998.
Xilinx Virtex 1.1 1998.
Xilinx Virtex 2.2 2000.
Xu et al., "Scheduling Processes with Release Times, Deadlines, Predence, and Exclusion Relations," IEEE Transactions on Software Engineering 16(3):360-9 (Mar. 1990).

* cited by examiner

METHOD AND SYSTEM FOR PROVIDING A DEVICE WHICH CAN BE ADAPTED ON AN ONGOING BASIS

CROSS-REFERENCE TO RELATED APPLICATIONS

This application is related to U.S. patent application Ser. No. 09/815,122, filed on Mar. 22, 2001, entitled "Adaptive Integrated Circuitry with Heterogeneous and Reconfigurable Matrices of Diverse and Adaptive Computational Units Having Fixed, Application Specific Computational Elements." Said application is hereby incorporated by reference as if set forth in full in this document.

FIELD OF THE INVENTION

The present invention relates generally to adaptive hardware devices and more specifically adapting a hardware device on an ongoing basis.

BACKGROUND OF THE INVENTION

Traditional consumer electronic devices have substantially fixed functionality. Devices such as cell phones, digital audio players, personal digital assistants (PDAs), global positioning satellite (GPS) terminals, etc., are designed, manufactured and marketed as a specific type of device with a specific feature set. Typically, a manufacturer of a new device makes decisions at the very outset of design or manufacturing as to what functions the device will perform, which standards (e.g., communication transfer standard, data format standard, etc.) the device will be compatible with, etc. This requires selection of appropriate integrated circuit (IC) chips, or the design of new chips and circuitry.

A next step in manufacturing the device is the "board-level" design and assembly. The IC chips are arranged with other circuitry, user controls, connectors, etc., on a singular assembly such as a printed-circuit (PC) board. Typically, a new design is needed for each new device as different chips and other components are being used.

Next, a chassis designer and manufacturer is used to create and enclose the assembly in a housing, or shell. Again, this is a customized step as the packaging for a new board assembly is usually unique. After the assembly is incorporated into the housing package the device is physically completed.

Often times it is desirable to change the product based upon location and time. For example, at a sporting event, concert or other entertainment activity it may be desired to provide certain information to users of a hardware device such as a telephone, PDA or the like for advertising, promotional or other reasons. Present hardware devices are not easily adaptable for such purposes.

Accordingly, what is desired is to provide a hardware device which can be adequately changed based upon location and/or time. The present invention addresses such a need.

SUMMARY OF THE INVENTION

A method and system for adapting a device is disclosed. The method and system comprises providing a data stream to the device to be changed based upon a parameter. In a second aspect an adaptable device is disclosed. The adaptable device comprises an adaptable computerized environment (ACE) for receiving a data stream that allows the device to be changed based upon a parameter. The adaptable device includes a mechanism within the ACE for authorizing the data stream.

A system and method in accordance with the present invention provides a hardware device that can be changed based upon a particular parameter such as time and location. In so doing, a provider of the hardware device can provide a more adaptable component which provides more value to the provider. Indeed, it is possible to give away the hardware upfront or even give an incentive to a receiver of the hardware and thereby use the device in a variety of ways.

DETAILED DESCRIPTION

The present invention relates generally to adaptive hardware devices and more specifically adapting a hardware device on an ongoing basis. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

The present invention provides for adapting a device used in commercial consumer electronic devices. Although the present application is presented primarily with respect to consumer electronic devices and relevant standards, aspects of the invention can be used with other types of electronic devices and other standards, licensed technology or functionality.

Figure 1:
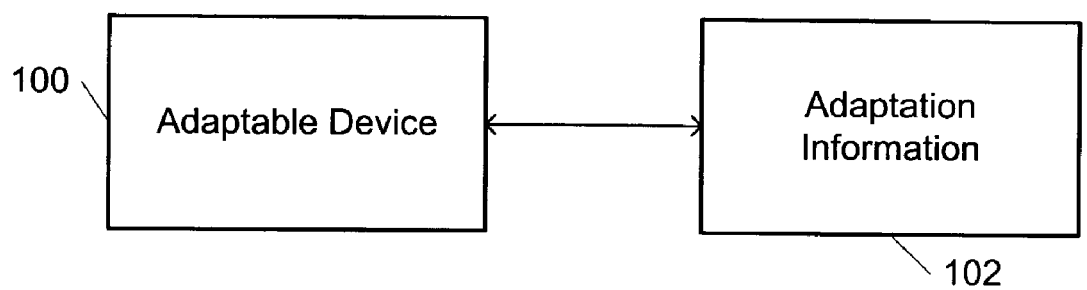
FIG. 1 illustrates an adaptable device in accordance with the present invention.

An adaptable device is initially provided to a distribution network by an original manufacturer of the device represented by adaptable device 100. A preferred embodiment of the invention uses a device including an adaptive computing engine (ACE) that is described in detail in the co-pending patent application referenced above, entitled "Adaptive Integrated Circuitry with Heterogeneous and Reconfigurable Matrices of Diverse and Adaptive Computational Units Having Fixed, Application Specific Computational Elements." It should be apparent that any type of adaptable hardware device design is adaptable for use with the present invention. For example, the adaptable device can be any type of adaptable device using other architectures or design methodologies, such as a device using a general-purpose processor, multiprocessing, application-specific integrated circuit (ASIC), field-programmable gate array (FPGA), dedicated circuitry, etc., or combination of the foregoing. The adaptable device can be adapted with a desired standard, or other functionality, at the point of initial shipping of the device. This is represented in FIG. 1 by an arrow from adaptation information 102 to adaptable device 100. The device can be adapted by adaptation information loaded into the device by any type of communication means such as reading magnetic media, using a digital network such as a local-area network (LAN), the interne; using a hardwire transfer, using optical or radio-frequency communication, etc. Some types of standards to which the device can be adapted to use include data formats and communication standards. For example, where a device is intended to perform a cellular telephone function, standards such as TDMA, CDMA, voice-over interne protocol (VoIP), analog, digital satellite, or other standards can be employed. Where a device is an audio playback device, formats such as Moving Pictures Expert's Group (MPEG) version 3, Real-Networks' "RealAudio" (.ra), Quicktime's (.mov), digital audio (.wav), Microsoft Media Player (.au) or other formats can be used. Where a device is a global positioning system (GPS) receiver the appropriate standards can be used. Many other types of standards and functionality can be suitable for use with the present invention.

Figure 2:
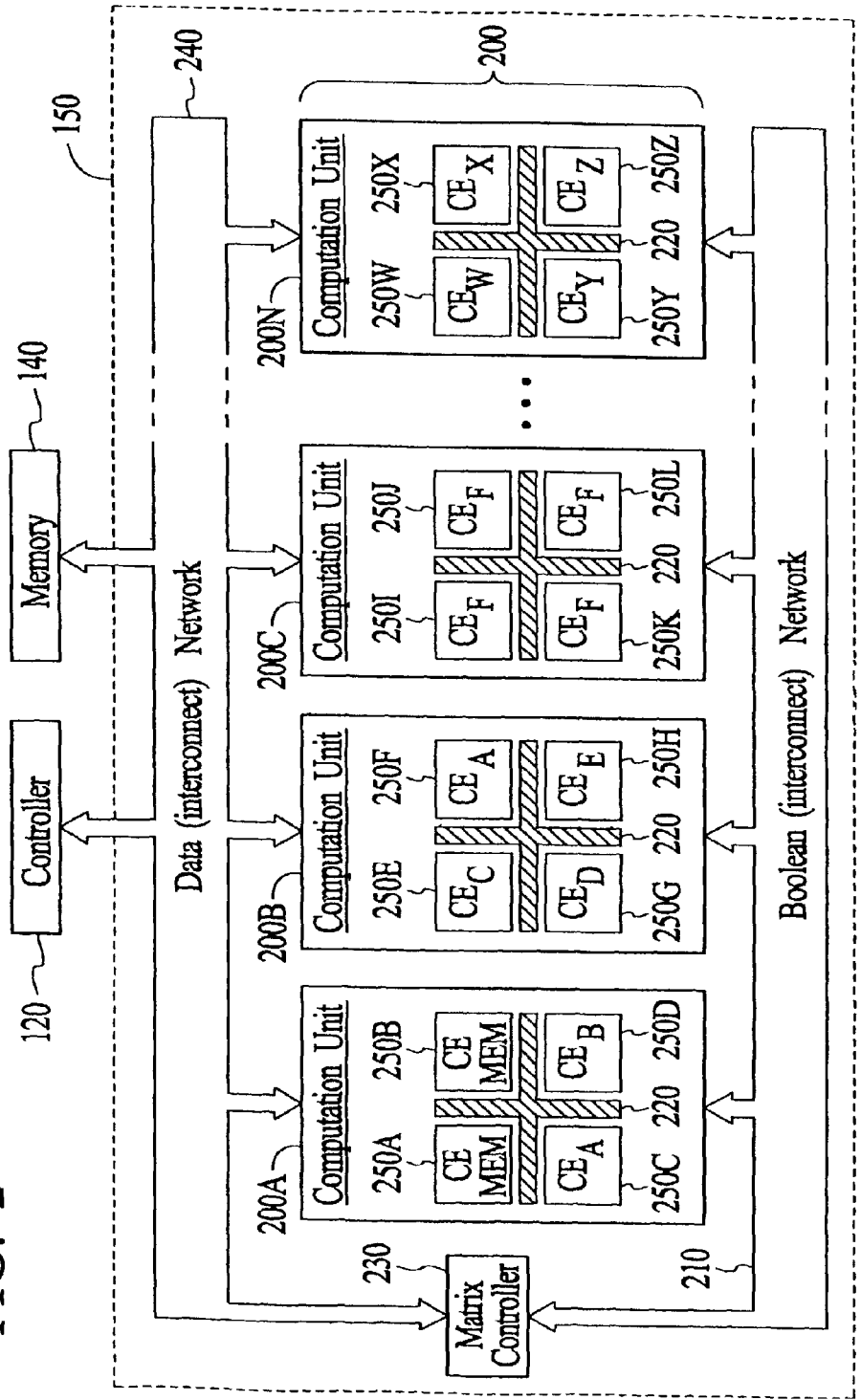
FIG. 2 illustrates basic parts of an adaptable device architecture based on an adaptive computing environment (ACE) approach.

FIG. 2 illustrates basic parts of a adaptable device architecture based on an adaptive computing environment (ACE) approach. Such an approach is discussed in detail in the co-pending patent application referenced above. The ACE architecture uses small processing elements called nodes, or matrices. The matrices are each designed to be specialized in one basic type of processing such as arithmetic, bit manipulation, finite state machine, memory oriented or reduced instruction set computing (RISC) approaches. The matrices are provided with adaptable interconnection networks. A scheduler performs the task of mapping an operation, or function, onto the matrices. Once mapped, the function can execute for a while before a next function is mapped onto the same set of matrices. In this manner, the functionality of a device that includes the matrices can be changed quickly and efficiently.

In FIG. 2, adaptable matrix 150 includes a plurality of computation units 200 (illustrated as computation units 200A through 200N). Computation units include a plurality of computational units 250 (illustrated as computational elements 250A through 250Z). As illustrated in FIG. 2, matrix 150 generally includes a matrix controller 230 and plurality of computation (or computational) units 200 as logical or conceptual subsets or portions of a matrix interconnect network. Also shown are data interconnect network 240 and Boolean interconnect network 210. Interconnect networks can have different levels of interconnectivity and flexibility for greater levels of adaptability and adaptation. In an applied architecture, the matrix represented by FIG. 2 is replicated within a single chip, or chipset, and interconnected with each other to provide a scalable approach to providing processing resources. A network interconnecting matrices (not shown) is referred to as a matrix interconnection network.

Boolean interconnect network 210 provides adaptation and data interconnection capability between and among the various computation units 200, and is preferably small (i.e., only a few bits wide). Data interconnect network 240 provides the adaptation and data interconnection capability for data input and output between and among the various computation units 200, and is preferably comparatively large (i.e., many bits wide). It should be noted, however, that while conceptually divided into adaptation and data capabilities, any given physical portion of the matrix interconnection network, at any given time, may be operating as either the Boolean interconnect network 210, the data interconnect network 240, the lowest level interconnect 220 (between and among the various computational elements 250), or other input, output, or connection functionality.

Continuing to refer to FIG. 2, included within a computation unit 200 are a plurality of computational elements 250, illustrated as computational elements 250A through 250Z (individually and collectively referred to as computational elements 250), and additional interconnect 220. The interconnect 220 provides the adaptable interconnection capability and input/output paths between and among the various computational elements 250. As indicated above, each of the various computational elements 250 consist of dedicated, application specific hardware designed to perform a given task or range of tasks, resulting in a plurality of different, fixed computational elements 250. Utilizing the interconnect 220, the fixed computational elements 250 may be adaptably connected together into adaptive and varied computational units 200, which also may be further adapted and interconnected, to execute an algorithm or other function, at any given time, utilizing the interconnect 220, the Boolean network 210, and the matrix interconnection network (not shown).

In a preferred embodiment, the various computational elements 250 are designed and grouped together, into various adaptive and adaptable computation units 200. In addition to computational elements 250 which are designed to execute a particular algorithm or function, such as multiplication or addition, other types of computational elements 250 are also utilized. As illustrated in FIG. 2, computational elements 250A and 250B implement memory, to provide local memory elements for any given calculation or processing function (compared to more "remote" or auxiliary memory that can be external to the matrix). In addition, computational elements 250I, 250J, 250K and 250L are adapted to implement finite state machines to provide local processing capability especially suitable for complicated control processing.

With the various types of different computational elements 250 that may be available, depending upon the desired functionality, the computation units 200 may be loosely categorized. A first category of computation units 200 includes computational elements 250 performing linear operations, such as multiplication, addition, finite impulse response filtering, and so on. A second category of computation units 200 includes computational units 250 performing non-linear operations, such as discrete cosine transformation, trigonometric calculations, and complex multiplications. A third type of computation unit 200 implements a finite state machine, such as computation unit 200C as illustrated in FIG. 2, particularly useful for complicated control sequences, dynamic scheduling, and input/output management, while a fourth type may implement memory and memory management, such as computation unit 200A. Lastly, a fifth type of computation unit 200 may be included to perform bit-level manipulation, such as for encryption, decryption, channel coding, Viterbi decoding, and packet and protocol processing (such as Internet Protocol processing).

In addition to the ways of determining functionality for general-purpose processing devices, as described above, the functionality of a device using the ACE architecture can be determined by adaptation information that is used to schedule operations on the computation units. Usage information can include the availability, types and frequency of use of different computation units. Adaptation of the interconnect network, number of active computation units over time, rate of execution of operations, etc., can all be used as usage parameters.

The present invention provides for the devices to be adapted at any point based upon a parameter such as location or time. Note that such an approach provides advantages in quickly meeting consumer demand for specific types of devices. For example, if demand for TDMA cellular phones suddenly increases. The devices can merely be adapted as TDMA devices anywhere in the various entities of FIG. 1.

Naturally, the adaptation information can be transferred to a location prior to, or in the absence of, actual devices being present at the location. The adaptation information can be stored and used at a later time.

A key feature of the present invention is providing a hardware device that can be changed based upon a particular parameter such as time and location. In so doing, a provider of the hardware device can provide a more adaptable component which provides more value to the provider. Indeed, it is possible to give away the hardware upfront or even give an incentive to a receiver of the hardware and thereby use the device in a variety of ways. To describe the features of the present invention in more detail, refer to the following description in conjunction with the accompanying drawings.

Figure 3:
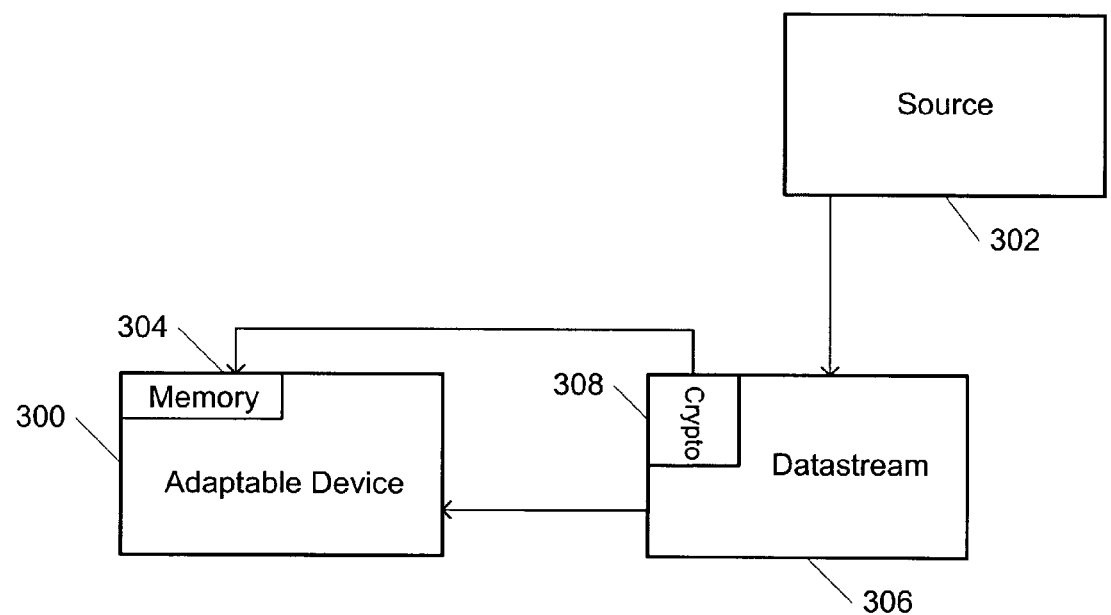
FIG. 3 illustrates a system for providing an adaptive hardware device that can be changed based upon location and time.

FIG. 3 illustrates a system for providing an adaptive hardware device 300 that can be changed based upon location and time. As is seen, a source 302 provides a data stream 306 to the device. The device 300 has a location in its memory 304 which receives a crypto algorithm 308 as part of that data stream. That crypto algorithm 308 can, for example, be limited in time, limited in a number of operations, limited in distance, or have other types of limitations to provide a potential revenue stream to the provider. Through the use of the crypto algorithm only devices that are authorized can receive the particular configuration. Through the use of this type of system in conjunction with the ACE architecture, an adaptable device can be provided. This concept can be extended to other applications which will be described hereinbelow.

Distributed Network

Figure 4:
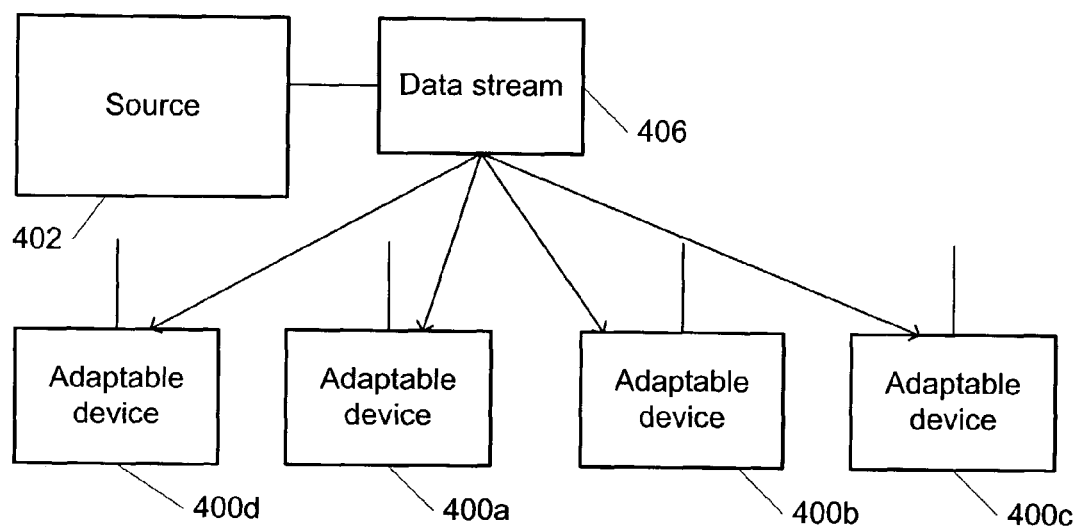
FIG. 4 shows a plurality of mobile devices which include an ACE architecture.

FIG. 4 shows a plurality of mobile devices 400a-400d, each of which includes an ACE architecture. Each of the mobile devices 400a-400d can receive the data stream 406 from a source 402. Each of the devices can receive the data from the source 402, but they also each include an adaptive self-caching mechanism which would allow each of them to receive information from each other. Hence, for example, it would likely be possible that a particular local mobile device 400 had some or all of the information from the source. One of the other mobile devices 400a-400c could obtain that information directly from that mobile device 400a rather than having to receive the stream from the source 402.

Since the mobile devices are closer to each other than to the source, this would allow for quicker downloads than having to go to the source. In addition, it is also possible that each of the devices has separate pieces of the overall information, so that once again a local device could determine based on the other devices what pieces of information that it needed were locally provided and then what pieces of information they would need to get from the source and connect all of those pieces together.

These devices could receive information from one stream or a plurality of streams and would be advantageously used in a variety of environments. For example, a sporting event where a plurality of these devices are present would allow for information to be provided related to advertisements, etc., that a particular vendor or vendors associated with that sporting event or entertainment event would provide. Accordingly, an individual entering a location near such an event or activity could receive an almost infinite amount of data streams based upon the particular demographic, the particular location, the particular time that the individual is within that particular environment. Accordingly, an adaptive device is provided which has significant utility for a variety of applications.

Multiple Communication Protocols

Figure 5:
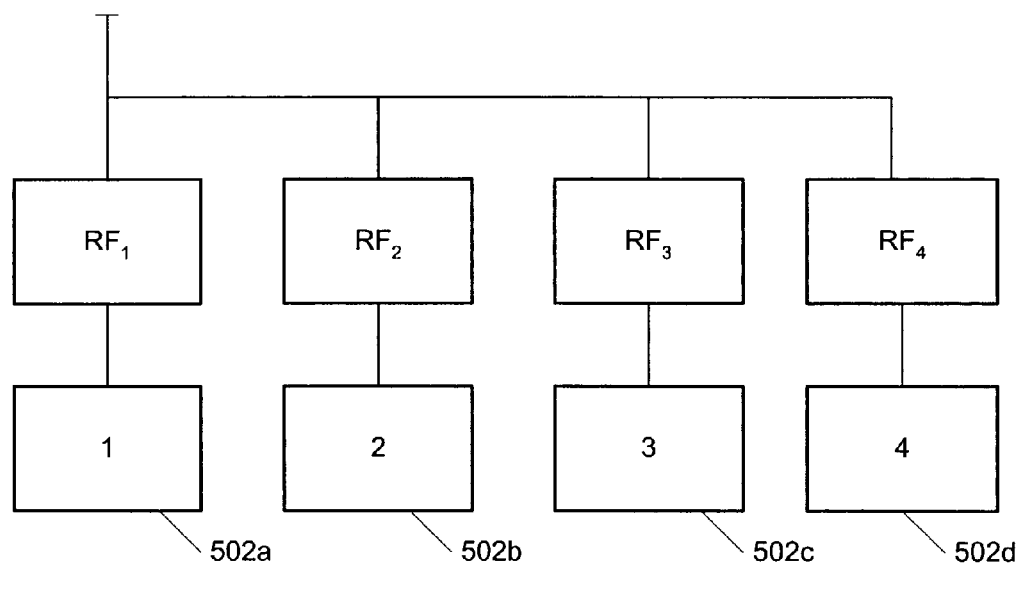
FIG. 5 is a block diagram of a conventional multimode multiband receiver.

This could be used in an environment where there are multiple communication protocols in which the multimode multiband receiver can receive the signals. In a conventional receiver, if there are multiple communication protocols, there would be separate signals which are provided to separate chips, such as shown in FIG. 5. FIG. 5 is a block diagram of a conventional multimode multi-band receiver 500 in which there are a plurality of RF signals and a plurality of chips/integrated circuits associated with the signals. For example, in this device, there is an integrated circuit 502a for receiving an 802.1b signal, an integrated circuit 502b for receiving 802.1a signals, an integrated circuit 502c for receiving a GPR3 signal, and finally an integrated circuit 502d for receiving a Com2 signal. Each of these integrated circuits would require time and effort to design and produce.

Figure 6:
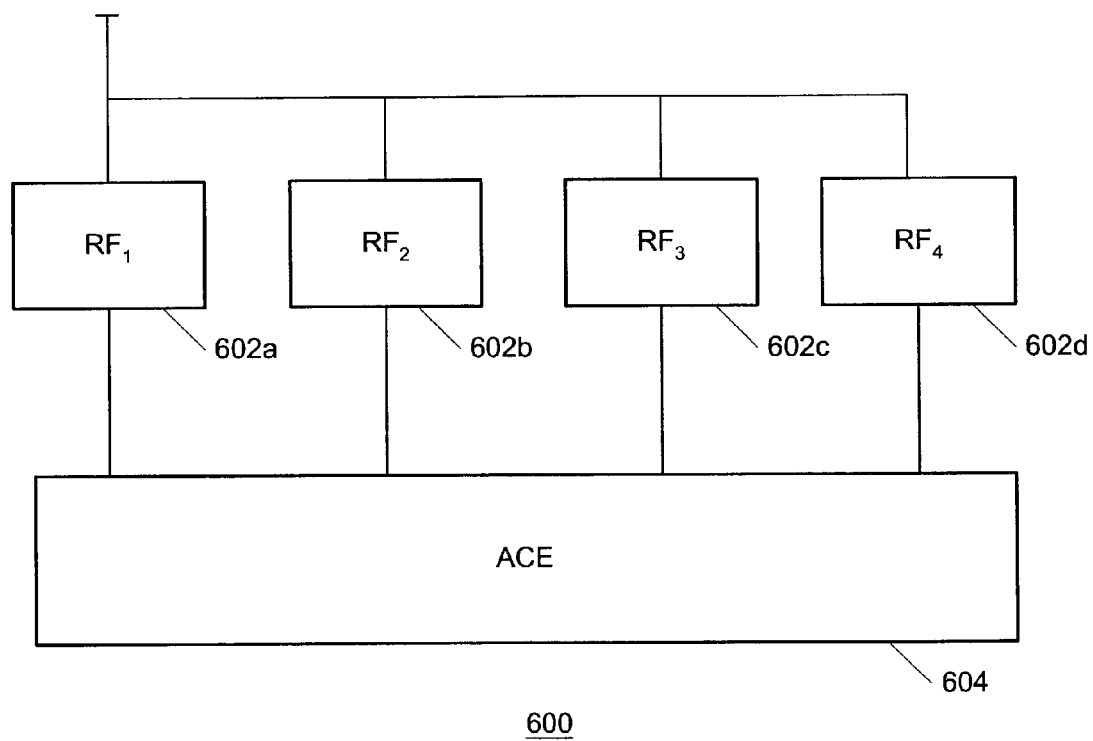
FIG. 6 illustrates a multimode multiband receiver in accordance with the present invention.

FIG. 6 illustrates a multimode multi-band receiver 600 in accordance with the present invention. The receiver 600 handles the same protocols as those of FIG. 5. Utilizing an ACE architecture 604, multiple communication protocols can be provided to that ACE architecture and the data streams associated with the particular communication protocols 602a-602d that are desired and can be used therein. Thereby there is a self-selecting mechanism that can be utilized that is based upon a particular set of information being provided to the device.

A key feature of the present invention is providing a hardware device that can be changed based upon a particular parameter such as time and location. In so doing, a provider of the hardware device can provide a more adaptable component which provides more value to the provider. Indeed, it is possible to give away the hardware upfront or even give an incentive to a receiver of the hardware and thereby use the device in a variety of ways.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for adapting a configurable device, the configurable device comprising an interconnection network coupled to a plurality of heterogeneous computational units each including a plurality of computational elements, the method comprising:

determining whether the configurable device is to be adapted via the interconnection network changing interconnections between a selected plurality of computational elements of the plurality of heterogeneous computational units to perform a second function different from the first function based upon at least one parameter, the at least one parameter comprising at least one of a time of day parameter and a demographic parameter, the configurable device previously configured to perform a first function via changing interconnections of the interconnection network between selected computational elements of the plurality of computational units in response to adaptation information, wherein the plurality of heterogeneous computational units are hardware components and at least one of the plurality of heterogeneous computational units differs from another one of the plurality of computational units; and when the configurable device is to be adapted, providing a data stream to the configurable device, the data stream comprising adaptation information to configure the configurable device to perform the second function different from the first function by changing interconnections between selected computational elements of the plurality of heterogeneous computational units.

2. The method of claim 1 wherein the determining whether the configurable device is to be adapted is based upon a second parameter in addition to the at least one parameter.

3. The method of claim 1 wherein data stream includes authorization information including a crypto-algorithm which authorizes the device to receive the data stream.

4. The method of claim 3 wherein the crypto algorithm is based upon at least one limitation, the at least one limitation comprising at least one of time, number of operations, geographic distance, and geographic location.

5. The method of claim 1, wherein the configurable device is a telephone, the at least one parameter comprises the time of day parameter, and the configurable device is configured to change from a first communication standard to a second communication standard.

6. The method of claim 1, wherein the selected parameter is a demographic parameter, and the configurable device is configured to receive advertising information targeted to the demographic parameter.

7. A distributed network comprising:
   a source for providing a data stream with adaptation information;
   a plurality of adaptable devices for receiving the data stream from the source;
   each of the plurality of adaptable devices including an adaptive computing circuit including an interconnection network coupled to a plurality of heterogeneous hardware computational units each including a plurality of computational elements, at least one of the computational units differing from another one of the computational units, the adaptive computing circuit previously configured to perform a first function via changing interconnections between selected computational elements of the plurality of heterogeneous computational units in response to adaptation information; and
   wherein the adaptive computing circuit is configured to perform a second function different from the first function based upon at least one parameter, the at least one parameter comprising at least one of a time of day parameter and a demographic parameter, the adaptive computing circuit configured to perform the second function by changing interconnections between selected computational elements of the plurality of heterogeneous computational units in response to the adaptation information.

8. The distributed network of claim 7 wherein the corresponding device to be changed is based on a second parameter from the plurality of parameters in addition to the at least one parameter.

9. The distributed network of claim 7 wherein the data stream further comprises a crypto algorithm which authorizes the device to receive the data stream.

10. The distributed network of claim 9 wherein the crypto algorithm is based on at least one limitation of a plurality of limitations, the plurality of limitations comprising at least one of time, number of operations and geographic location of the device.

11. A method for adapting a configurable device, the configurable device comprising an interconnection network coupled to a plurality of heterogeneous computational units, each including a plurality of computational elements, the method comprising:
   determining whether the configurable device is to be adapted via the interconnection network changing interconnections between a selected plurality of computational elements of the plurality of heterogeneous computational units to perform a second function different from a first function based upon a time of day parameter, the configurable device previously configured to perform the first function based on changing interconnections of the interconnection network between selected computational elements of the plurality of heterogeneous computational units in response to adaptation information, wherein the plurality of heterogeneous computational units are hardware components and wherein at least one of the computational units differs from another one of the computational units; and
   when the configurable device is to be configured to perform the second function, providing a data stream to the configurable device, the data stream comprising adaptation information to adapt the configurable device to perform the second function different from the first function by changing interconnections between selected computational elements of the plurality of heterogeneous computational units.

12. The method of claim 11, wherein the configurable device is a telephone configured to change from a first communication standard to a second communication standard.

13. The method of claim 11 wherein data stream includes authorization information including a crypto-algorithm which authorizes the device to receive the data stream.

14. A method for adapting a configurable device, the configurable device comprising an interconnection network coupled to a plurality of heterogeneous computational units each including a plurality of computational elements, the method comprising:
   determining whether the configurable device is to be adapted via the interconnection network changing interconnections between a selected plurality of computational elements of the plurality of heterogeneous computational units to perform a second function different from a first function based upon a demographics parameter, the configurable device previously configured to perform the first function by changing interconnections of the interconnection network between selected computational elements of the plurality of heterogeneous computational units in response to adaptation information, wherein the plurality of computational units are hardware components and at least one of the computational units differs from another one of the computational units; and
   when the configurable device is to be configured to perform the second function, providing a data stream to the configurable device, the data stream comprising adaptation information to adapt the configurable device to perform the second function different from the first function by changing interconnections between selected computational elements of the plurality of heterogeneous computational units.

15. The method of claim 14, wherein the configurable device is configured to receive advertising information targeted to the demographic parameter.

16. The method of claim 14 wherein data stream includes authorization information including a crypto-algorithm which authorizes the device to receive the data stream.

* * * * *